United States Patent
Szabó et al.

(10) Patent No.: US 7,065,746 B2
(45) Date of Patent: Jun. 20, 2006

(54) INTEGRATION INTEGRITY MANAGER

(75) Inventors: Pamela Szabó, Houston, TX (US);
Dáquer Reverón, Humble, TX (US);
Anjaneyullu Tamma, Houston, TX (US)

(73) Assignee: Stone Bond Technologies, L.P., Houston, TX (US)

( * ) Notice: Subject to any disclaimer, the term of this patent is extended or adjusted under 35 U.S.C. 154(b) by 238 days.

(21) Appl. No.: 10/044,611

(22) Filed: Jan. 11, 2002

(65) Prior Publication Data
US 2003/0135840 A1 Jul. 17, 2003

(51) Int. Cl.
*G06F 9/45* (2006.01)

(52) U.S. Cl. ...................................... 717/121

(58) Field of Classification Search ................ 717/172, 717/177, 166, 104, 121
See application file for complete search history.

(56) References Cited

U.S. PATENT DOCUMENTS

| | | | |
|---|---|---|---|
| 5,297,262 A * | 3/1994 | Cox et al. ................... 710/36 |
| 5,377,350 A | 12/1994 | Skinner |
| 5,560,013 A | 9/1996 | Scalzi et al. |
| 5,592,664 A * | 1/1997 | Starkey ........................ 707/1 |
| 5,764,911 A * | 6/1998 | Tezuka et al. ............... 709/223 |
| 5,991,536 A * | 11/1999 | Brodsky et al. ............ 717/104 |
| 6,012,067 A * | 1/2000 | Sarkar ..................... 707/103 R |
| 6,341,287 B1 * | 1/2002 | Sziklai et al. ................ 707/102 |
| 6,356,933 B1 | 3/2002 | Mitchell et al. |
| 6,393,419 B1 | 5/2002 | Novak et al. |
| 6,523,022 B1 | 2/2003 | Hobbs |
| 2001/0044820 A1 | 11/2001 | Scott |
| 2002/0026339 A1 * | 2/2002 | Frankland et al. .............. 705/7 |
| 2002/0147748 A1 | 10/2002 | Huang et al. |
| 2003/0041179 A1 | 2/2003 | Snead et al. |
| 2003/0046681 A1 * | 3/2003 | Barturen et al. ............ 717/177 |
| 2003/0055878 A1 | 3/2003 | Fletcher et al. |
| 2003/0065826 A1 | 4/2003 | Skufca et al. |
| 2003/0065827 A1 | 4/2003 | Skufca et al. |
| 2003/0126301 A1 | 7/2003 | Mason et al. |
| 2003/0140058 A1 | 7/2003 | Martin et al. |
| 2003/0145134 A1 * | 7/2003 | Wehage et al. ................. 710/1 |
| 2003/0172368 A1 | 9/2003 | Alumbaugh et al. |
| 2005/0114201 A1 | 5/2005 | Walsh et al. |

OTHER PUBLICATIONS

Schmidt, Model Independent Assertions for Integration of Hetergeneous Schemas, 1992, ACM, p. 81-126.*
Anick et al, Versioning a Full text Information Retrieval System, 1992, ACM, p. 98-111.*
Philip E. Courtney, Enterprise Enabler—From Stone Bond, Providing Integration Integrity, *eAI Journal*, Oct., 2001.

(Continued)

*Primary Examiner*—John Chavis
(74) *Attorney, Agent, or Firm*—Jenkens & Gilchrist (57) ABSTRACT

Computerized method and system of managing the integrity of an integrated applications environment are disclosed. An integration integrity manager detects changes in the components of the interface between the applications. The integration integrity manager identifies components of other interfaces 208 that may be affected by the change, and notifies the owners or responsible parties of the applications that use the affected interfaces 208. The owners or responsible parties are given an opportunity to resolve any conflicts via the recursive operation of the integration integrity manager. Once the conflicts have been resolved, all changes are implemented together.

48 Claims, 6 Drawing Sheets

OTHER PUBLICATIONS

Pamela Szabo, Managing the Integration Process, *e*AI Journal, Apr. 2001.
International Search Report, Mar. 31, 2003.
U.S. Appl. No. 10/188,503, P. Szabo et al.
International Search Report, PCT, PCT/US03/19826, Mailed Oct. 17, 2003.
Pires, nerac.com Retro Search document, Feb. 5, 2002.
Johnson, nerac.com Retro Search document, Jan. 2, 2002.

* cited by examiner

INTEGRATION INTEGRITY MANAGER

BACKGROUND OF THE INVENTION

1. Field of the Invention

The present invention relates to integration integrity and, in particular, to a system and method for managing the integrity of integrated business or enterprise applications.

2. Description of the Related Art

In an environment where data is extracted from and transferred between various and disparate applications (e.g., accounting, inventory, sales), application integration and specifically Enterprise Application Integration (EAI) refers to the process of making sure each application is provided with the expected types of data and in the correct formats. Such an integration process typically involves defining how to get data from and send data to each application, mapping and transforming each set of data, scheduling the data extractions and transfers, validating the data, and other similar tasks. The advantage of a high level of integration is that a corporation, institution, or other entity can respond quickly to changing economic or organizational conditions.

Unfortunately, a highly integrated system can create interdependencies where a small change in one application may adversely impact obvious or seemingly unrelated applications. Consider the number of changes that must be administered, for example, to support a business merger or acquisition, a new software system, a move to e-business, or even routine correction of errors. Each change can cause one or more application, interface, or other component that depends on the changed application to become unstable, thereby compromising the integrity of the integration.

One way to ensure the integrity of an integrated systems is to identify each change and evaluate the impact on other applications prior to releasing or implementing the change. In most integrated environments, however, virtually all changes require some programming change, which means finding and modifying the source code, compiling it, and testing it. Unfortunately, most integrated systems do not have the capability to monitor for such changes, since coding is done manually and other construction is done in an ad hoc manner.

Another way to ensure integration integrity is to manually monitor the data shared by each application. Under this approach, a person who is responsible for the application and who knows the usage and value of the application checks to make sure that all extracted data is correct and that all incoming data is properly mapped to the application. If there is a change to any business process, data process, or other application supporting or supported by the application, the person ensures that the appropriate change is made to the application.

Accordingly, it is desirable to be able to provide a computerized method and system of managing the integrity of an integrated applications environment. More specifically, it is desirable to be able to ensure the stability of interrelated and interdependent applications and business processes, while providing analysis information regarding changes to data flows and format.

SUMMARY OF THE INVENTION

The present invention is directed to a computerized method and system of managing the integrity of an integrated applications environment. An integration integrity manager detects changes in the components of the interface between the applications. The integration integrity manager identifies components of other interfaces that may be affected by the change, and notifies the owners or responsible parties of the applications that use the affected interfaces. The owners or responsible parties are given an opportunity to resolve any conflicts via the recursive operation of the integration integrity manager. Once the conflicts have been resolved, all changes are implemented together.

In general, in one aspect, the invention is directed to a computerized method of managing integrity of an integrated applications environment. The method comprises the step of detecting a change in a component of the integrated applications environment, identifying one or more additional components of the integrated applications environment that are affected by the change, and notifying one or more responsible parties for each application using a component affected by the change.

In general, in another aspect, the invention is directed to a computer system for managing integrity of an integrated applications environment. The computer system comprises a central processing unit, and a storage unit connected to the central processing unit. The storage unit stores computer readable instructions for causing the central processing unit to detect a change in a component of the integrated applications environment, identify one or more additional components of the integrated applications environment that are affected by the change, and notify one or more responsible parties for each application using a component affected by the change.

In general, in yet another aspect, the invention is directed to a computerized method of managing integrity of an enterprise applications integration environment. The method comprises the steps of detecting a change in a component of the enterprise applications integration environment, identifying one or more additional components of the enterprise applications integration environment that are affected by the change, and notifying one or more responsible parties for each application using a component affected by the change. The method further comprises implementing the change in the enterprise applications integration environment based upon feedback from the responsible parties, repeating the detecting, identifying, and notifying steps for each additional change to a component of the enterprise applications integration environment, and logging an information associated with each change.

In general, in still another aspect, the invention is directed to a computer system for managing integrity of an enterprise applications integration environment. The computer system comprises a central processing unit, and a storage unit connected to the central processing unit. The storage unit stores computer readable instructions for causing the central processing unit to detect a change in a component of the enterprise applications integration environment, identify one or more additional components of the enterprise applications integration environment that are affected by the change, and notify one or more responsible parties for each application using a component affected by the change. The computer readable instructions further cause the central processing unit to implement the change in the enterprise applications integration environment based upon feedback from the responsible parties, repeat the detecting, identifying, and notifying instructions for each additional change to a component of the enterprise applications integration environment, and log an information associated with each change.

BRIEF DESCRIPTION OF THE DRAWINGS

A more complete understanding of the invention may be had by reference to the following detailed description when taken in conjunction with the accompanying drawings, wherein.

DETAILED DESCRIPTION OF THE INVENTION

Following is a detailed description of the drawings wherein like and similar reference numerals are used to designate like and similar elements throughout the various figures.

Embodiments of the invention provide a computerized system and method for managing the integrity of the interfaces between integrated or interdependent applications and processes. In some embodiments, the integration integrity manager of the invention detects a change to a component of an interface and identifies the components, applications, and process that are affected by the change. In some embodiments, the integration integrity manager also detects a change to an application or a business process. The integration integrity manager of the invention thereafter notifies the owner or a responsible party of the affected applications and processes. Based on the feedback received from the notified parties, in some embodiments, the integration integrity manager of the invention implements the changes.

Figure 1:
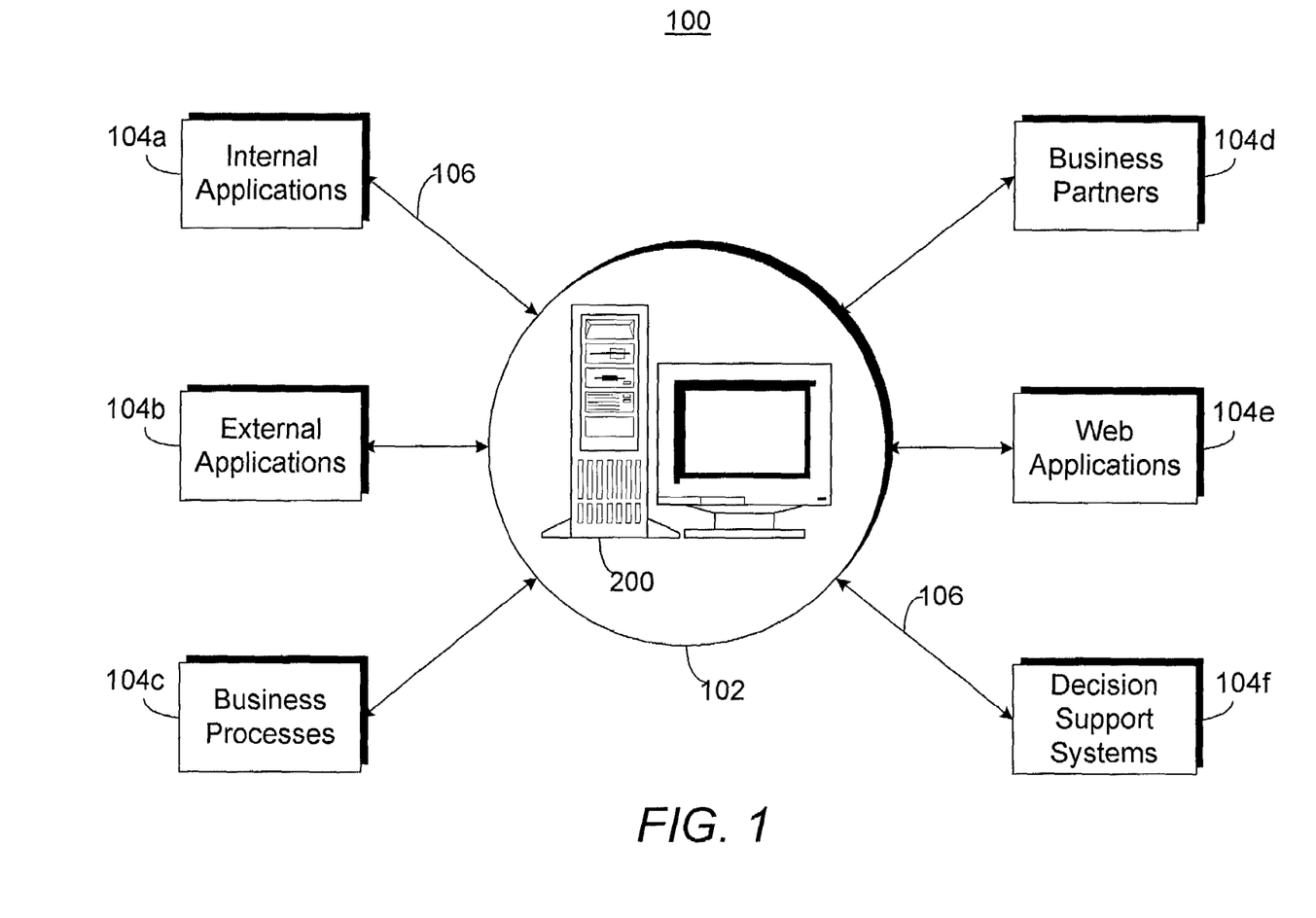
FIG. 1 illustrates a plurality of integrated applications and processes according to some embodiments of the invention.

Referring now to FIG. 1, a plurality of disparate and distributed internal applications 104a and external applications 104b, processes 104c, business partners 104d, Web-based applications 104e, decision support systems 104f, and the like, "applications 104" hereinafter, receive data from and through an interface system 102. Such an environment may be found, for example, in a corporation, government agency, academic institution, or any other entity where the transfer of data is a routine function. Although the various applications 104 may have or use different data types and formats, they are able to exchange data with one another via the interface system 102 between the applications 104. A plurality of communication connections 106 (e.g., LAN, WAN, intranet, Internet, wireless connection) connect the applications 104 to the interface system 102. The hardware platform for the interface system 102 includes one or more servers or high-end computers 200 that are capable of providing sufficient data processing and storage capacity to satisfy the demands that may be placed on the servers or high-end computers 200.

Figure 2:
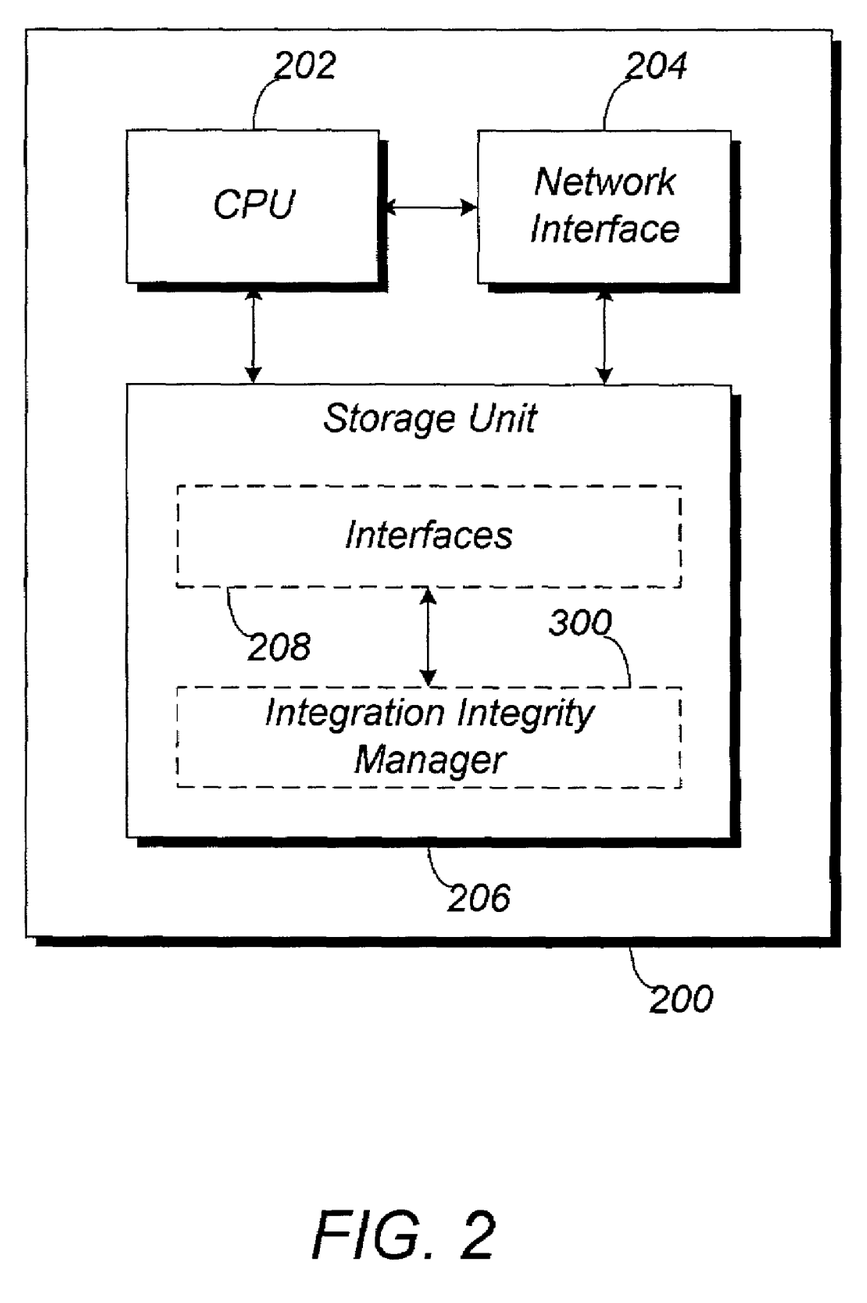
FIG. 2 illustrates a computerized system for managing the integrity of the interfaces between integrated applications and processes according to some embodiments of the invention.

FIG. 2 illustrates a functional block diagram of the server or high-end computer 200. As can be seen, the server or high-end computer 200 contains a number of components including a central processing unit 202, network access unit 204, and a storage unit 206. The central processing unit 202 may include one or more microprocessors, DSP, ASICS, or other data processing units, and is responsible for the overall operation of the server or high-end computer 200 including the execution of any software programs thereon. The network access unit 204 may include an Ethernet card or other network access cards, and provides the server or high-end computer 200 with access to a network. The storage unit 206 may include long-term data storage devices such as magnetic memory and optical memory, as well as short-term data storage devices such as random access memory (RAM).

Stored within the storage unit 206 are software programs and data that are needed by the central processing unit to operate the server or high-end computer 200 including one or more interfaces 208. The interfaces 208 allow applications 104 that have or use different data formats and/or types to exchange data with one another. More specifically, the interfaces 208 define the data sources, templates, maps, destination, and various other components that are used by the applications 104 to extract and transfer data. In some arrangements, the interfaces 208 may be set up on a point-to-point basis, that is, each application is directly interfaced to one or more corresponding applications 104. In other arrangements, the interfaces 208 may be set up as part of a centralized clearinghouse or messaging facility for data to be used by all applications 104. Although point-to-point connectivity is used throughout the remainder of this description, the particular connectivity of the interfaces 208 is not critical to the practice of the invention and any number of configurations may be used without departing from the scope of the invention.

When data is transferred between the applications 104, the central processing unit 202 accesses one or more predefined interfaces 208 for the applications 104 to convert the data into the correct data format and/or type for each application. Consequently, a change in a component of an interface 208 (e.g., a change to the field name in a data template) may adversely affect one or more applications 104 that use the interface, thereby compromising the integrity of the interfaces 208. Therefore, in accordance with the principles and teaching of the invention, an integration integrity manager 300 is included in the storage unit 206 to ensure the integrity of the interfaces 208.

The integration integrity manager 300 is configured to monitor the components of the interfaces 208 between the various applications 104 and detect changes to the components and, in some embodiments, also to the applications and processes. Where a change is detected beforehand, the change is placed in a temporary holding stage while information about the change is logged and recorded in the storage unit 206. For all changes, the integration integrity manager 300 identifies the components of other interfaces 208 that may be affected by the change, and notifies the owners or responsible parties for the applications 104 that use the affected components. The integration integrity manager 300 then gives all affected users an opportunity to provide feedback regarding any impact to their applications 104 before the change to the component is implemented.

When all issues have been resolved, the integration integrity manager 300 updates the affected components to reflect all proposed changes.

Figure 3:
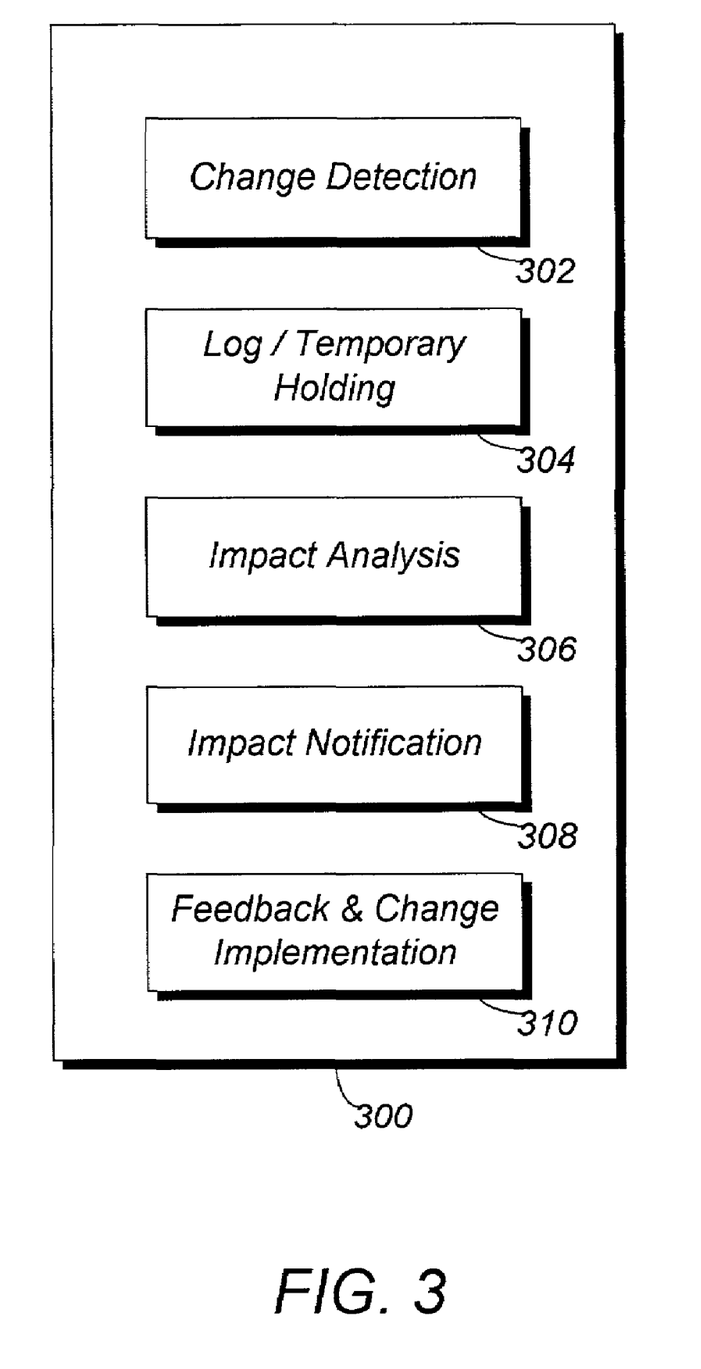
FIG. 3 illustrates the functional components of an integration integrity manager according to some embodiments of the invention.

A more detailed illustration of the integration integrity manager 300 is shown in the functional block diagram of FIG. 3. As can be seen, the integration integrity manager 300 is composed of a number of modules including a change detection module 302, a log/temporary holding module 304, an impact analysis module 306, an impact notification module 308, and feedback and change implementation module 310. Although shown here as separate modules, the invention is not to be limited thereto. Instead, it will be understood by those of ordinary skill in the art that several modules may be combined into a single module, or one or more modules may be divided into several sub-modules. The modules are described in turn below.

The change detection module 302 is configured to detect changes in the components that make up the interface for each application. In some embodiments, the change detection module 302 can monitor the components of all the interfaces 208 and automatically detect the changes to the components before they are implemented. For example, the change detection module can tie into a version control system of the interfaces and can detect when a second copy of a file or data object is created. Alternatively, a process may be implemented whereby user notification is sent to the change detection module 302 prior to implementation each time a change to a component is made. In the case where the components are stored as metadata, a forward and reverse search of the old metadata and the new metadata can be performed to determine exactly what items (e.g., field name, target source, target destination) have been changed. The forward search can detect changed and/or deleted items in a component by comparing the new metadata with the old metadata using the old metadata as a reference. The reverse search can detect new items in a component by comparing the old metadata with the new metadata using the new metadata as a reference. In other embodiments, change detection may be accomplished after the fact, for example, by implementing a "watchdog" function as part of the change detection module. The "watchdog" function can detect when a change has been made to a component by checking to see, for example, if the time stamp or date stamp of the component has changed. This "watchdog" approach may be used also to detect a change in applications that provide or accept data from the integration components.

When a change is detected beforehand, in some embodiments, the log/temporary holding module 304 places the changed component in a temporary holding stage. This step prevents the new component from automatically replacing the old component. Thereafter, information regarding the change is collected and recorded in the storage unit 206. Such information may include, for example, the name and user ID of the person making the change, the time and date of the change, the type of change and its criticality, the action performed (e.g., add, update, delete), and any user comments associated with the change.

During the time that the changed component is held in the temporary holding stage, the impact analysis module 306 searches the interfaces 208 to identify any components that may be affected by the change. One or more predefined criteria may then be used to determine whether a component is affected. For example, in the case where a field name in a template has been changed, a component is considered to be affected only if it actually used the particular field name in that template. In some embodiments, the impact analysis module 306 includes a user interface that allows the person making the change to preview a list of the components that are affected and the owners or responsible parties associated therewith. The user may then decide whether or not to proceed with the contemplated change based on the previewed information.

Figure 4:
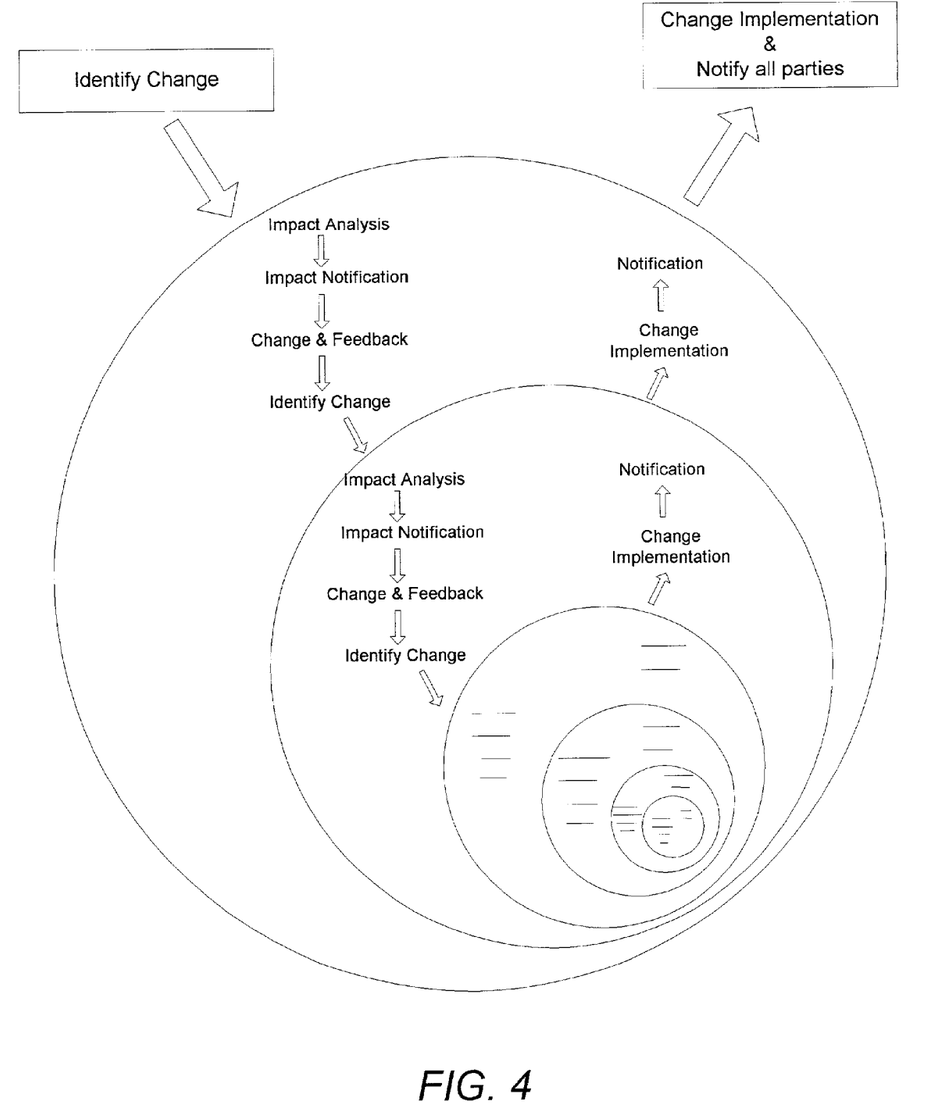
FIG. 4 illustrates the operation of an integration integrity manager in a recursive manner according to some embodiments of the invention.

After the impact analysis has been completed, the impact notification module 308 notifies the owners or responsible parties of the applications that use the affected components. Such notification may be accomplished, for example, by email, a pop-up screen, or other similar notification techniques. In some embodiments, the email or popup screen notification may include a URL that provides all the information regarding the change. The URL may also include a number of drop-down menus, combo boxes, check boxes, and text boxes to allow the notified party to provide feedback regarding the contemplated change. The feedback may include, for example, that the contemplated change presents no problem, or that it will require a corresponding change to a component of some other interface. If a corresponding change is required, the integration integrity manager 300 initiates another round of impact analysis, notification, feedback, and change identification for the corresponding change. Such an arrangement may result in the integration integrity management process being performed in a recursive manner, as can be seen in FIG. 4, with the possibility that several new changes may be required. The integration integrity manager 300 repeats the impact analysis, notification, feedback, and change identification functions until all issues have been resolved based on the feedback from the affected parties, and no additional changes are required.

After all issues have been resolved, the feedback and change implementation module 310 updates all the affected components in accordance with their contemplated changes based on the feedback received. In this manner, all the contemplated changes may be rolled out in a sequence dictated by their dependencies.

Although the integration integrity manager 300 has been described thus far with respect to managing changes in the components of the interfaces 208, the invention is not to be limited thereto. In some embodiments, the integration integrity manager 300 may also manage the changes in the applications 104 themselves, as opposed to or as well as the interfaces 208. Such changes may be detected by implementing a procedure whereby information regarding changes to the applications 104 are forwarded to the integration integrity manager 300 either manually by a user or automatically by a suitable applications management system. The integration integrity manager 300 thereafter uses the information to perform an impact analysis to identify the interfaces 208 that are affected and the applications 104 that rely on those interfaces 208. The owners or responsible parties for those applications 104 are then notified of the changes and given an opportunity to provide feedback, as described above.

In some embodiments, changes to an application may be detected after the fact by "pinging" the applications 104. For example, an entire data object may be deleted or moved, or the name of the data object may be changed. In these embodiments, the changes have already taken place and cannot be prevented, but the integration integrity manager 300 can still notify the owners or responsible parties for the affected applications 104 to minimize the impact.

For applications that are business processes (e.g., an invoice processing process), a typical process management system can detect when a change to a process is made. Such a change can trigger a notification mechanism in the process management system to send a notification message including information regarding the change to the integration integrity manager 300. The integration integrity manager 300 thereafter performs an impact analysis to identify the components, applications, or business processes that are affected by the change. Notification is then sent to the owners or responsible parties for those applications or business processes, and an opportunity for feedback is provided.

Figure 5:
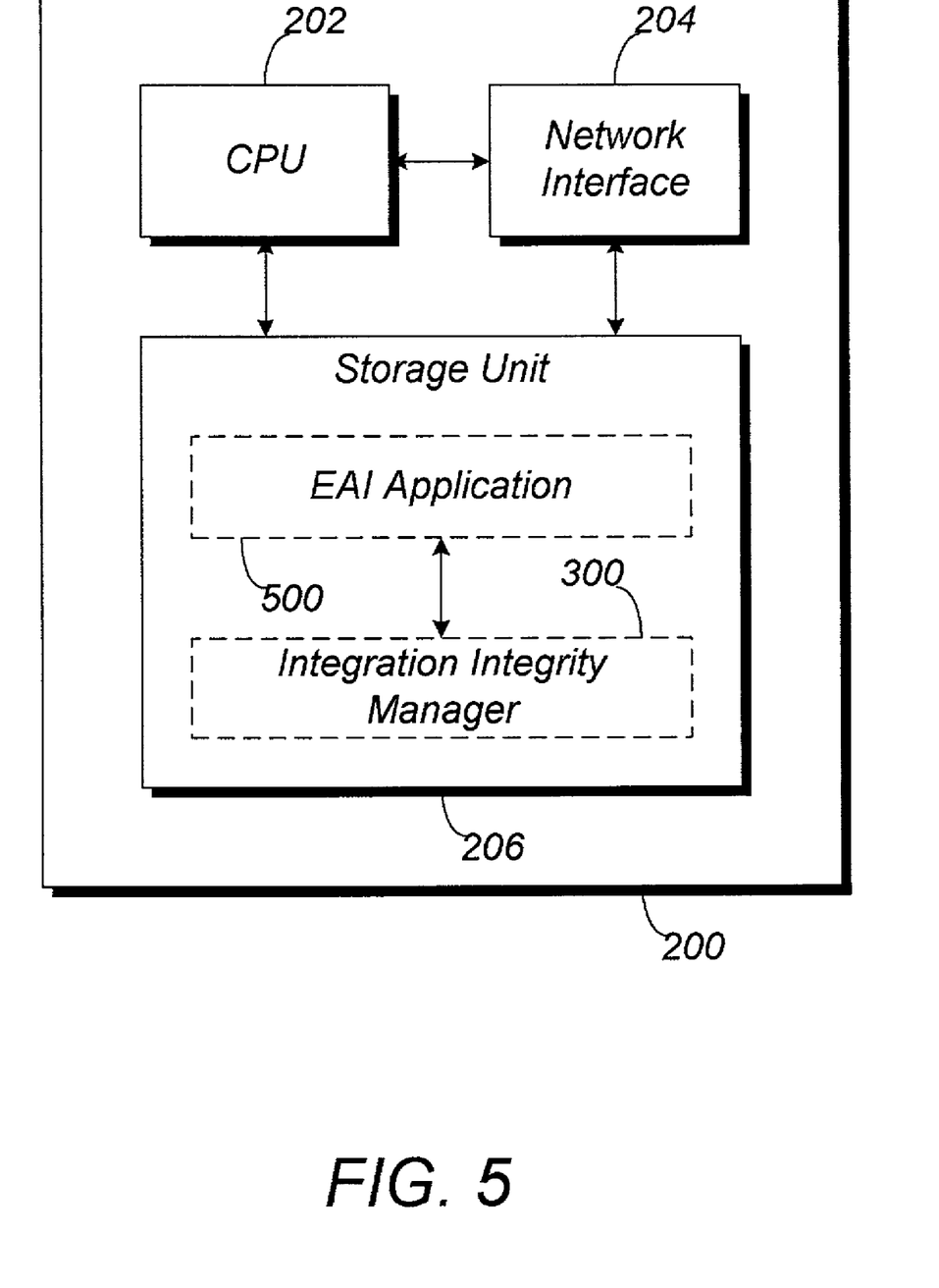
FIG. 5 illustrates another computerized system for managing the integrity of the interfaces between integrated applications and processes according to some embodiments of the invention.

Referring now to FIG. 5, in some embodiments, instead of storing only the interfaces, the storage unit 206 stores an EAI application 500 that defines and manages the interfaces for each application. The EAI application 500 also performs data extraction, transformation, translation, as well as a number of other related tasks. Such a process integrates all the information exchanged across the applications 104, thereby facilitating a fast, synchronized, and unified response to any financial or economic situation or condition that may arise. In addition, the EAI application 500 manages the flow of data to and from each application 104. For example, the EAI application 500 schedules the transfer of data based on some event or time period; validates the data (e.g., only use data for volumes of more than 50 gallons), and operates against one or more business rules (e.g., use Friday's data for Monday's process), formulas, or unit of measurement conversion; and processes the data using one or more data filters. Such an EAI application 500 may be, for example, the Enterprise Enabler™ available from Stone Bond corporation, 3040 Post Oak Boulevard, Suite 1550, Houston, Tex. 77056.

Because the EAI application 500 defines and manages the components that make up the interface for each application, any change to a component of the interface can be readily detected. Thus, an advantage of using an EAI application 500 such as Enterprise Enabler™ is the change detection mechanism therein can facilitate the integration integrity management process. Specifically, the change detection module 302 may rely on the change detection mechanism of an EAI application 500 such as Enterprise Enabler™ to detect changes in a component prior to implementation. Such an EAI application 500 has an advantage, as mentioned earlier, in that the changes are readily detected by virtue of the EAI application's ability to define and manage the components that make up the interface for each application 104.

Figure 6:
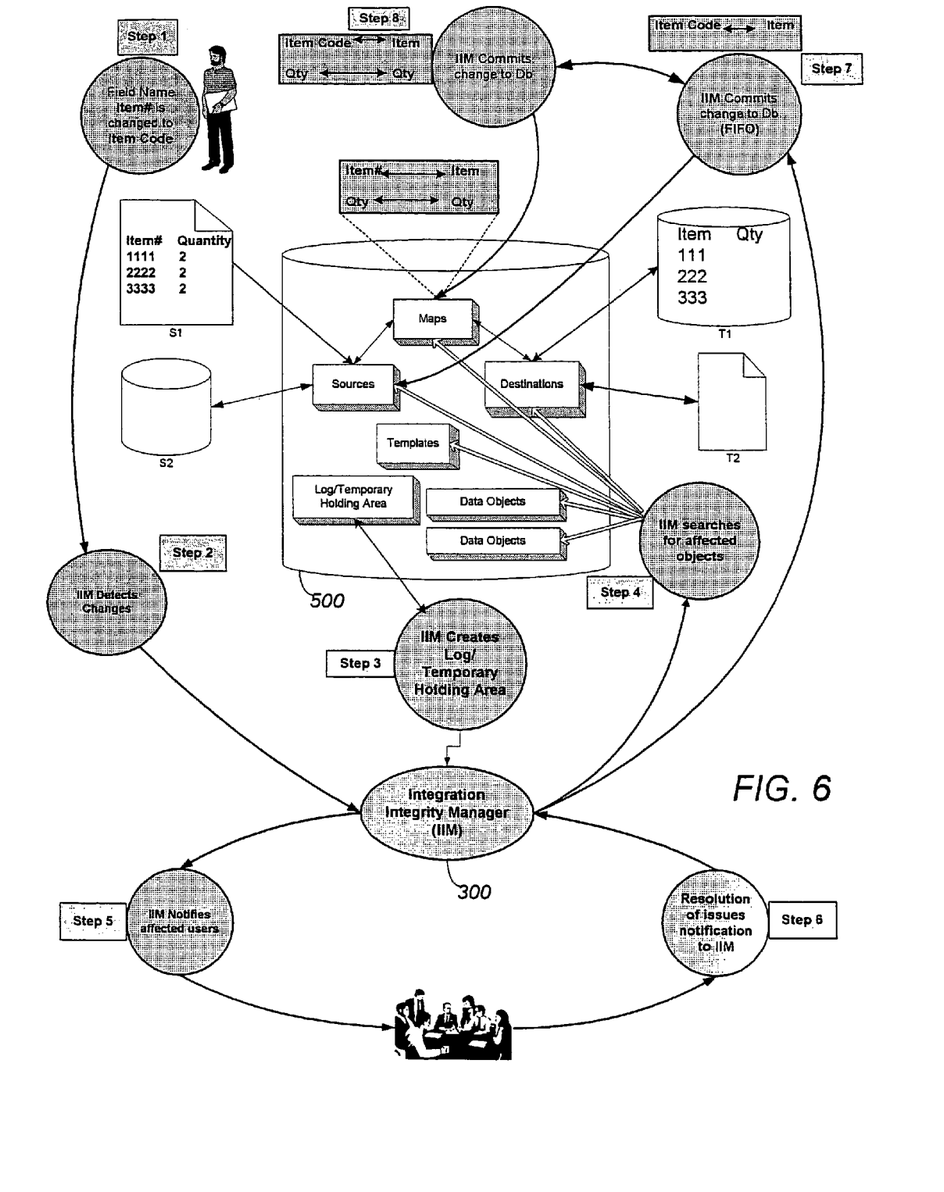
FIG. 6 illustrates a computerized method for managing the integrity of the interfaces between integrated applications and processes according to some embodiments of the invention.

FIG. 6 illustrates the operation of the integration integrity manager 300 with regard to an exemplary change in an EAI application 500. As can be seen, the EAI application 500 includes a number of components that make up the interface for each application including source definitions, map definitions, target or destination definitions, as well as a number of other data objects. At step 1, a user has decided to change the field name "Item#" to "Item Code" in source definition S1 (a data template). The integration integrity manager 300 detects the change at step 2 and creates a log of the change including placing the changed component in a temporary holding stage at step 3. The search of the EAI application 500 is initiated at step 4 to identify affected components or objects, and notification is sent to the affected owners or responsible parties at step 5. The owners or responsible parties have an opportunity to resolve any issues or differences at step 6. If during the resolution process one or more new changes need to be made, then several iterations of the integration integrity manager 300 is run to accommodate the new changes. Finally, based on feedback from the owners or responsible parties of the affected components that all issues have been resolved, the affected components are updated at step 7, and the changed component is committed to the EAI application database at step 8.

As demonstrated by the foregoing, embodiments of the invention provide a system and method of managing the integrity of the interfaces 208 in an integrated applications environment. While a limited number of embodiments have been disclosed herein, those of ordinary skill in the art will recognize that variations and modifications from the described embodiments may be derived without departing from the scope of the invention. Accordingly, the appended claims are intended to cover all such variations and modifications as falling within the scope of the invention.

What is claimed is:

1. A computerized method of managing an integrity of an integrated applications environment where data is extracted from and transferred among often disparate applications via integration components, comprising the steps of:
   detecting a change in said integrated applications environment, said integrated applications environment including a plurality of software applications and integration components, said software applications running on a plurality of systems and said integration components facilitating transfer of data among said software applications, said data having one or more of different usages, different data formats, and different data types among said software applications;
   identifying substantially all integration components and software applications of said integrated applications environment for which said transfer of data would be affected by said change; and
   notifying one or more responsible parties for each identified software application and integration component.

2. The method according to claim 1, further comprising implementing said change in said integrated applications environment based upon feedback from said responsible parties.

3. The method according to claim 2, further comprising repeating said detecting, identifying, and notifying steps for each additional change in said integrated applications environment.

4. The method according to claim 1, further comprising the logging information associated with said change.

5. The method according to claim 1, wherein said integration components of said integrated applications environment include data sources, data destinations, data templates, data maps, data schedules, conversion formulas, filters, and business rules.

6. The method according to claim 1, wherein said integration components of said integrated applications environment are composed of metadata, and said step of detecting includes comparing an old set of metadata with a new set of metadata.

7. The method according to claim 6, wherein said step of comparing includes performing a forward comparison and a reverse comparison.

8. The method according to claim 1, further comprising previewing a list of integration components and software applications and responsible parties to be notified.

9. The method according to claim 1, wherein said detecting step includes detecting a change in one of said software applications.

10. The method according to claim 9, wherein said integrated applications environment includes a business process and said detecting step includes detecting a change in said business process.

11. The method according to claim 1, wherein said integrated applications environment is an Enterprise Application Integration (EAI) environment.

12. The method according to claim 1, wherein said step of notifying includes notifying a responsible party only when said transfer of data for said integration components and said software applications would be affected in a predefined manner.

13. The method according to claim 1, wherein said step of detecting includes detecting a change in one of said integration components.

14. A computer system for managing an integrity of an integrated applications environment where data is extracted from and transferred among often disparate applications via integration components, comprising:
  a central processing unit;
  a storage unit connected to said central processing unit, said storage unit storing computer readable instructions for causing said central processing unit to:
  detect a change in said integrated applications environment, said integrated applications environment including a plurality of software applications and integration components, said software application running on multiple platforms and said integration components facilitating transfer of data among said software applications, said data having one or more of different usages, different data formats, and different data types among said software applications;
  identify substantially all integration components and software applications of said integrated applications environment for which said transfer of data would be affected by said change; and
  notify one or more responsible parties for each identified software application and integration component.

15. The computer system according to claim 14, wherein said computer readable instructions cause said central processing unit to implement said change in said integrated applications environment based upon feedback from said responsible parties.

16. The computer system according to claim 14, wherein said computer readable instructions cause said central processing unit to repeat said detecting, identifying, and notifying instructions for each additional change in said integrated applications environment.

17. The computer system according to claim 14, wherein said computer readable instructions cause said central processing unit to update each identified integration component and software application in accordance with said change.

18. The computer system according to claim 14, wherein said computer readable instructions cause said central processing unit to log information associated with said change.

19. The computer system according to claim 14, wherein said integration components of said integrated applications environment include data sources, data destinations, data templates, data maps, data schedules, conversion formulas, filters, and business rules.

20. The computer system according to claim 14, wherein said integration components of said integrated applications environment are composed of metadata, and said computer readable instructions cause said central processing unit to compare an old set of metadata with a new set of metadata to detect said change.

21. The computer system according to claim 20, wherein said computer readable instructions cause said central processing unit to perform a forward comparison and a reverse comparison.

22. The computer system according to claim 14, wherein said computer readable instructions cause said central processing unit to allow the user to preview a list of integration components and software applications and responsible parties to be notified.

23. The computer system according to claim 14, wherein said computer readable instructions cause said central processing unit to notify a responsible party only when said transfer of data for said integration components and said software applications would be affected in a predefined manner.

24. The computer system according to claim 14, wherein said computer readable instructions cause said central processing unit to detect a change by detecting said change in one of said integration components.

25. The computer system according to claim 14, wherein said computer readable instructions cause said central processing unit to detect a change by detecting said change in one of said software applications.

26. The computer system according to claim 25, wherein said integrated applications environment includes a business process and said computer readable instructions cause said central processing unit to detect a change in said business process.

27. The computer system according to claim 14, wherein said integrated applications environment is an Enterprise Application Integration (EAI) environment.

28. A computerized method of managing an integrity of an enterprise application integration environment where data is extracted from and transferred among often disparate applications via integration components, comprising the steps of:
  detecting a change in said enterprise application integration environment, said enterprise application integration environment including a plurality of software applications and integration components, said software applications independent of one another and said integration components facilitating transfer of data among said software applications, said data having one or more of different usages, different data formats, and different data types among said software applications;
  identifying substantially all integration components and software applications of said enterprise application integration environment for which said transfer of data would be affected by said change;
  notifying one or more responsible parties for each identified software application and integration component;
  implementing said change in said enterprise application integration environment based upon feedback from said responsible parties; and
  logging information associated with each change.

29. The method according to claim 28, wherein said integration components of said enterprise application integration environment include data sources, data destinations, data templates, data maps, data schedules, conversion formulas, filters, and business rules.

30. The method according to claim 28, wherein said integration components of said enterprise application integration environment are composed of metadata, and said step of detecting includes comparing an old set of metadata with a new set of metadata.

31. The method according to claim 30, wherein said step of comparing includes performing a forward comparison and a reverse comparison.

32. The method according to claim 28, further comprising previewing a list of integration components and software applications and responsible parties to be notified.

33. The method according to claim 28, wherein said detecting step includes detecting a change in one of said software applications.

34. The method according to claim 33, wherein said enterprise application integration environment includes a business process and said detecting step includes detecting a change in said business process.

35. The method according to claim 28, wherein said step of notifying includes notifying a responsible party only when said transfer of data for said integration components and said software applications would be affected in a predefined manner.

36. The method according to claim 28, wherein said detecting step includes detecting a change in one of said integration components.

37. A computer system for managing an integrity of an enterprise application integration environment where data is extracted from and transferred among often disparate applications via integration components, comprising:
a central processing unit;
a storage unit connected to said central processing unit, said storage unit storing computer readable instructions for causing said central processing unit to:
detect a change in said enterprise application integration environment, said enterprise application integration environment including a plurality of software applications and integration components, said software applications independent of one another and said integration components facilitating transfer of data among said software applications, said data having one or more of different usages, different data formats, and different data types among said software applications;
identify substantially all integration components and software applications of said enterprise application integration environment for which said transfer of data would be affected by said change;
notify one or more responsible parties for each identified software application and integration component;
implement said change in said enterprise application integration environment based upon feedback from said responsible parties; and
log an information associated with each change.

38. The computer system according to claim 37, wherein said integration components of said enterprise application integration environment include data sources, data destinations, data templates, data maps, data schedules, conversion formulas, filters, and business rules.

39. The computer system according to claim 37, wherein said integration components of said enterprise application integration environment are composed of metadata, and said computer readable instructions cause said central processing unit to compare an old set of metadata with a new set of metadata to detect said change.

40. The computer system according to claim 39, wherein said computer readable instructions cause said central processing unit to perform a forward comparison and a reverse comparison.

41. The computer system according to claim 37, wherein said computer readable instructions cause said central processing unit to allow a user to preview a list of integration components and software applications and responsible parties to be notified.

42. The computer system according to claim 37, wherein said computer readable instructions cause said central processing unit to notify a responsible party only when said transfer of data for said integration components and software applications would be affected in a predefined manner.

43. The computer system according to claim 37, wherein said computer readable instructions cause said central processing unit to detect a change by detecting a change in one of said integration components.

44. The computer system according to claim 37, wherein said computer readable instructions cause said central processing unit to detect a change by detecting a change in one of said software applications.

45. The computer system according to claim 44, wherein said enterprise application integration environment includes a business process and said computer readable instructions cause said central processing unit to detect a change in said business process.

46. The method according to claim 1, wherein said software applications include databases, data sources, data streams, and web-based software applications.

47. The method according to claim 28, further comprising repeating said detecting, identifying, and notifying steps for each additional change in said enterprise application integration environment.

48. The computer system according to claim 37, wherein said computer readable instructions cause said central processing unit to repeat said detecting, identifying, and notifying instructions for each additional change in said enterprise application integration environment.

* * * * *